United States Patent
Cowelchuk et al.

(10) Patent No.: US 9,016,716 B2
(45) Date of Patent: Apr. 28, 2015

(54) AIRBAG DEPLOYMENT SYSTEM FOR A FABRIC WRAPPED VEHICLE INTERIOR PANEL

(75) Inventors: Glenn A. Cowelchuk, Holland, MI (US); Nels Smith, Zeeland, MI (US); Heather R. Springer, West Olive, MI (US); Mark S. Jurek, Rochester, MI (US); Ronald A. Bozio, Holland, MI (US); Sandra L. Smith, Waterford, MI (US); Jeffrey A. Deyoung, Holland, MI (US); Tony M. Pokorzynski, Holland, MI (US); David John McCarthy, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1 day.

(21) Appl. No.: 13/978,127

(22) PCT Filed: Jan. 6, 2012 (Under 37 CFR 1.47)

(86) PCT No.: PCT/US2012/020517
§ 371 (c)(1),
(2), (4) Date: Jan. 16, 2014

(87) PCT Pub. No.: WO2012/094614
PCT Pub. Date: Jul. 12, 2012

(65) Prior Publication Data
US 2014/0131983 A1 May 15, 2014

Related U.S. Application Data

(60) Provisional application No. 61/430,746, filed on Jan. 7, 2011.

(51) Int. Cl.
*B60R 21/205* (2011.01)
*B60R 21/2165* (2011.01)
*B60R 21/215* (2011.01)

(52) U.S. Cl.
CPC ..................... *B60R 21/215* (2013.01)

(58) Field of Classification Search
CPC ............. B60R 21/205; B60R 21/2165; B60R 2021/21506
USPC ................................. 280/728.3, 732
See application file for complete search history.

(56) References Cited

U.S. PATENT DOCUMENTS 5,217,253 A * 6/1993 Pray ............................. 280/732
5,851,023 A * 12/1998 Nagata et al. ............... 280/728.3
(Continued)

FOREIGN PATENT DOCUMENTS

| CN | 1291148 A | 4/2001 |
|---|---|---|
| CN | 101580019 A | 11/2009 |

(Continued)

OTHER PUBLICATIONS

KR Application #10-2013-7020918; Notice to File a response (English Translation); Sep. 25, 2014; 4 pages.
(Continued)

*Primary Examiner* — Paul N Dickson
*Assistant Examiner* — Laura Freedman
(74) *Attorney, Agent, or Firm* — Fletcher Yoder, P.C.

(57) ABSTRACT

An airbag deployment system is provided that includes a support structure, and a fabric material configured to form a show surface of a vehicle interior panel. A first portion of the fabric material is coupled to the support structure by a rigid connection, a second portion of the fabric material is coupled to the support structure by a detachable connection, and the detachable connection is configured to release the second portion of the fabric material from the support structure upon contact between an airbag and the fabric material.

20 Claims, 8 Drawing Sheets

(56) References Cited

U.S. PATENT DOCUMENTS

| | | | |
|---|---|---|---|
| 6,003,938 A | 12/1999 | Lachat | |
| 6,152,480 A * | 11/2000 | Iwanaga | 280/728.3 |
| 6,237,934 B1 * | 5/2001 | Harrell et al. | 280/728.3 |
| 6,299,197 B1 * | 10/2001 | Mueller | 280/728.3 |
| 6,447,004 B1 * | 9/2002 | Kawakubo et al. | 280/728.3 |
| 6,517,101 B1 * | 2/2003 | Bemis et al. | 280/728.3 |
| 6,733,033 B2 * | 5/2004 | Muller | 280/728.3 |
| 7,322,597 B2 * | 1/2008 | Tracht | 280/728.3 |
| 7,607,681 B2 * | 10/2009 | Okada et al. | 280/728.3 |
| 7,690,723 B2 * | 4/2010 | Evans et al. | 297/216.13 |
| 8,376,394 B2 * | 2/2013 | Gumprecht et al. | 280/728.3 |
| 2006/0177620 A1 | 8/2006 | Gray et al. | |

FOREIGN PATENT DOCUMENTS

| | | |
|---|---|---|
| EP | 2233372 A1 | 9/2010 |
| JP | H01109146 A | 4/1989 |
| JP | H10100837 A | 4/1998 |
| JP | H10217888 A | 8/1998 |
| JP | H10278721 A | 10/1998 |
| JP | H1160756 A | 3/1999 |
| JP | 2000142296 A | 5/2000 |
| JP | 2001080443 A | 3/2001 |
| JP | 2003252081 A | 9/2003 |
| JP | 2005088622 A | 4/2005 |
| WO | 0181126 A1 | 11/2001 |
| WO | 2005021309 2 A | 3/2005 |

OTHER PUBLICATIONS

International Search Report for application No. PCT/US2012/020517 mailed Jul. 12, 2012.

JP Office Action dated Jun. 4, 2014 (mailed Jun. 10, 2014); Application #2013-548581; 7 pages.

European Patent Office Communication Pursuant to Article 94(3) EPC dated May 2, 2014.

Chinese Office Action mailed Feb. 17, 2015.

* cited by examiner

__US 9,016,716 B2__

AIRBAG DEPLOYMENT SYSTEM FOR A FABRIC WRAPPED VEHICLE INTERIOR PANEL

CROSS REFERENCE TO RELATED APPLICATIONS

This application claims priority from and the benefit of PCT Application No. PCT/US2012/020517, filed on Jan. 6, 2012; and U.S. Provisional Patent Application No. 61/430,746, filed on Jan. 7, 2011; both entitled "Airbag Deployment System for a Fabric Wrapped Vehicle Interior Panel", which are herein incorporated by reference.

BACKGROUND

The invention relates generally to an airbag deployment system for a fabric wrapped vehicle interior panel.

Airbags may be positioned throughout a vehicle interior to substantially reduce the possibility of passenger contact with an interior surface during a high g-force event (e.g., rapid acceleration/deceleration associated with a vehicle impact). For example, an airbag may be positioned behind a portion of the instrument panel adjacent to a front passenger. During a high g-force event, the airbag will deploy, thereby reducing the possibility of contact between the front passenger and the instrument panel.

Typical instrument panels include an airbag door positioned adjacent to the front passenger and configured to enable the airbag to deploy. For example, if the instrument panel is composed of a soft plastic material (e.g., vinyl), the airbag door may include scored regions configured to tear as the airbag deploys. Such a configuration may provide a durable instrument panel, while facilitating airbag deployment. Further vehicle interiors include an instrument panel having a fabric (e.g., woven or non-woven) show surface adjacent to the front passenger. Unfortunately, providing an airbag door in such a fabric show surface may provide an undesirable appearance.

BRIEF DESCRIPTION OF THE INVENTION

The present invention relates to an airbag deployment system including a support structure, and a fabric material configured to form a show surface of a vehicle interior panel. A first portion of the fabric material is coupled to the support structure by a rigid connection, a second portion of the fabric material is coupled to the support structure by a detachable connection, and the detachable connection is configured to release the second portion of the fabric material from the support structure upon contact between an airbag and the fabric material.

The present invention also relates to an airbag deployment system including a support structure, and a fabric material configured to form a show surface of a vehicle interior panel. A first portion of the fabric material is rigidly coupled to a first portion of the support structure. The airbag deployment system also includes a facing rigidly coupled to a second portion of the support structure, and a thread configured to detachably secure the facing to a second portion of the fabric material. The thread is configured to break upon contact between an airbag and the fabric material.

The present invention further relates to an airbag deployment system including a substrate, a frame, and a fabric material configured to form a show surface of a vehicle interior panel. A first portion of the fabric material is compressed between the substrate and the frame to form a rigid connection, a second portion of the fabric material is compressed between the substrate and the frame via a release mechanism to form a detachable connection, and the release mechanism is configured to release the second portion of the fabric material from the substrate and the frame upon contact between an airbag and the fabric material.

DRAWINGS

DETAILED DESCRIPTION

Figure 1:
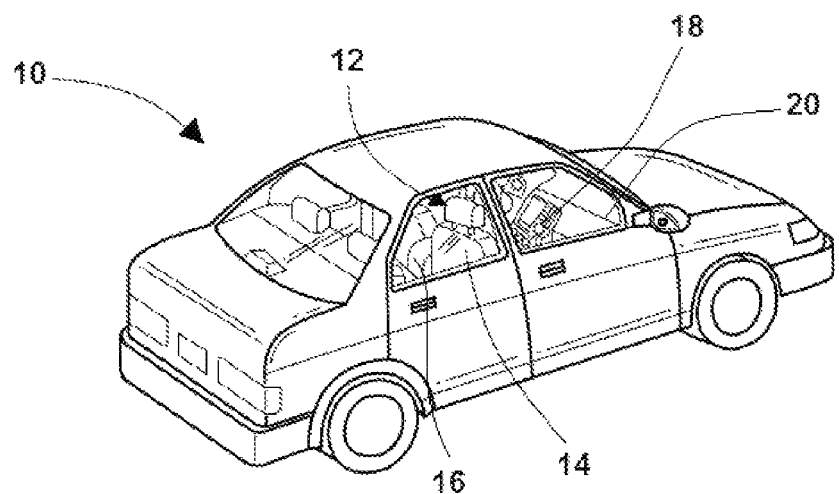
FIG. 1 is a perspective view of an exemplary vehicle that may include a fabric wrapped interior panel having an airbag deployment system.

FIG. 1 is a perspective view of an exemplary vehicle 10 that may include a fabric wrapped interior panel having an airbag deployment system. As illustrated, the vehicle 10 includes an interior 12 having a seat 14, an armrest 16, a center console 18, and an instrument panel 20. As discussed in detail below, the instrument panel 20 may include a show surface formed from a fabric material. As a result, airbag doors, such as those employed in instrument panels having a soft plastic (e.g., vinyl) show surface, may provide an undesirable appearance. Therefore, the fabric material of the illustrated instrument panel 20 may be configured to partially separate from a support structure to facilitate deployment of an airbag. For example, a first portion of the fabric material may be coupled to the support structure by a rigid connection, and a second portion of the fabric material may be coupled to the support structure by a detachable connection. In such a configuration, the detachable connection may be configured to release the second portion of the fabric material from the support structure upon contact between an airbag and the fabric material. In this manner, the airbag may contact a front passenger, thereby substantially reducing the possibility of contact between the front passenger and the instrument panel 20 during a high g-force event.

Figure 2:
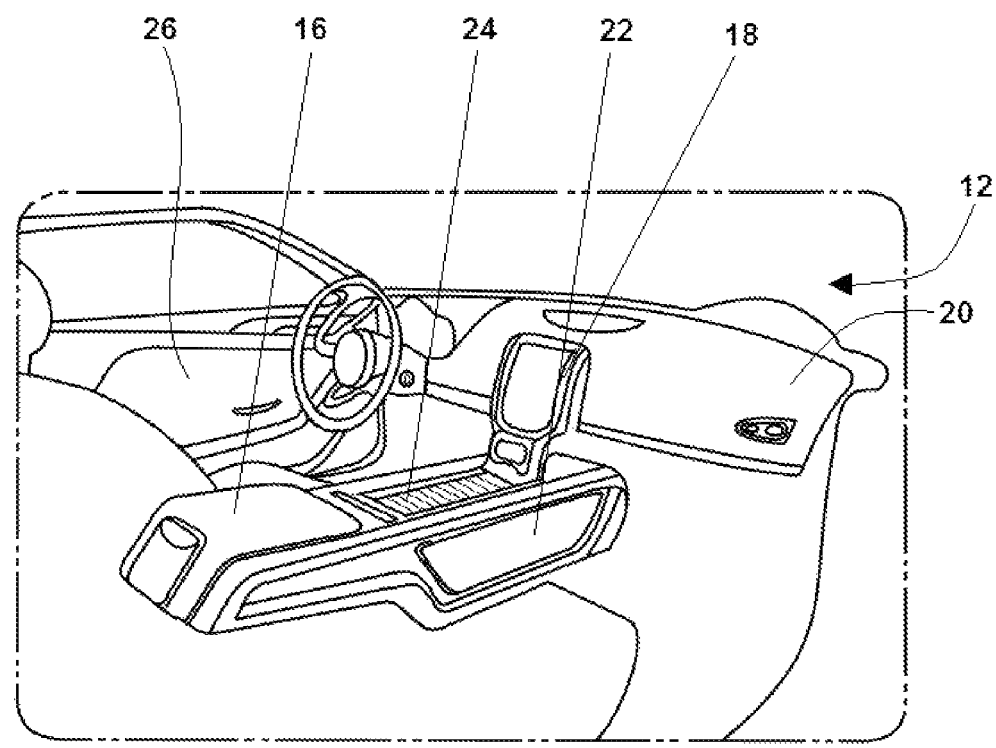
FIG. 2 is a perspective view of a part of the interior of the vehicle of FIG. 1.

FIG. 2 is a perspective view of a part of the interior 12 of the vehicle 10 of FIG. 1. As illustrated, the vehicle interior 12 includes a fabric wrapped instrument panel 20 configured to provide a durable surface while facilitating deployment of an airbag. As discussed in detail below, the fabric material forming the show surface of the instrument panel 20 is configured to partially separate from a support structure to enable the airbag to deploy during a high g-force event. While the airbag deployment system is described below with reference to the instrument panel 20, it should be appreciated that the airbag deployment system may be utilized for other fabric wrapped interior panels within the vehicle interior 12. For example, the illustrated interior 12 includes a floor console 22 having a tambour door 24. In certain embodiments, the floor console 22 may include fabric wrapped panels configured to facilitate airbag deployment. In addition, the illustrated interior 12 includes a fabric wrapped door panel 26 that may include an airbag deployment system.

Figure 3:
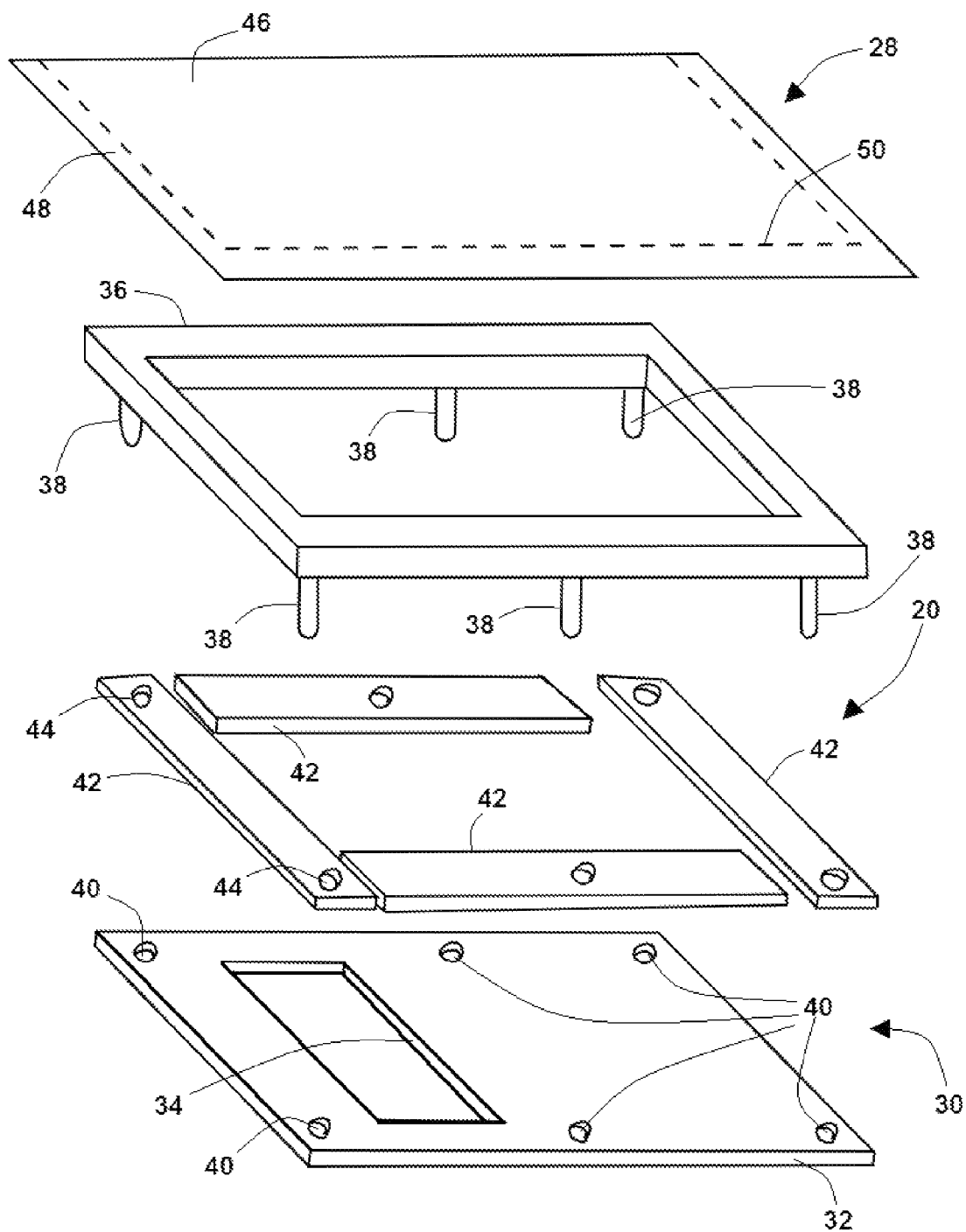
FIG. 3 is an exploded view of an embodiment of a fabric wrapped interior panel that may be employed within the vehicle of FIG. 1.

FIG. 3 is an exploded view of an embodiment of a fabric wrapped interior panel that may be employed within the vehicle 10 of FIG. 1. As illustrated, the fabric wrapped instrument panel 20 includes a cover 28 and a support structure 30. As discussed in detail below, the cover 28 is coupled to the support structure 30 to form a durable instrument panel 20, while facilitating airbag deployment. In the illustrated embodiment, the support structure 30 includes a substrate 32 having a chute 34. The chute 34 is configured to enable an airbag positioned behind the rear surface of the substrate 32 to expand toward the front passenger. As the airbag expands, a portion of the cover 28 will detach from the support structure 30, thereby facilitating contact between the airbag and the front passenger.

In the illustrated embodiment, the support structure 30 also includes a frame 36 configured to facilitate coupling between the cover 28 and the substrate 32. The frame 36 includes multiple studs 38 configured to engage corresponding holes 40 within the substrate 32. Once the studs 38 have been inserted within the holes 40, the frame 36 may be secured to the substrate 32 via a heat staking process. In certain embodiments, the studs 38 may be composed of a thermoplastic material (e.g., polyvinyl chloride, polyethylene, polycarbonate, etc.) that soften upon application of heat. In such embodiments, the studs 38 may be heated and deformed to form a head that mechanically locks the frame 36 to the substrate 32. While six studs 38 and holes 40 are included in the illustrated embodiment, it should be appreciated that more or fewer studs 38 and holes 40 may be employed within alternative embodiments. For example, certain embodiments may include 2, 4, 6, 8, 10, 12, 14, 16, 18, 20, or more studs 38 and a corresponding number of holes 40. Furthermore, while the frame 36 is secured to the substrate 32 via a heat staking process in the illustrated embodiment, it should be appreciated that alternative embodiments may utilize other connection mechanisms, such as mechanical fasteners or adhesives, for example. The illustrated embodiment also includes multiple pinch trims 42 positioned between the frame 36 and the substrate 32. As illustrated, the pinch trims 42 includes holes 44 configured to facilitate passage of the studs 38 into the holes 40. As discussed in detail below, the pinch trims 42 are configured to compress an edge of the cover 28 against the frame 36, thereby securing the cover 28 to the support structure 30.

In the illustrated embodiment, the cover 28 includes a fabric material 46 and a facing 48 coupled to one another via a detachable connection 50. The fabric material 46 is configured to form a show surface of the instrument panel 20, and may be composed of a woven or non-woven fabric, for example. In certain embodiments, the facing 48 may be composed of the same woven or non-woven fabric as the fabric material 46. Alternatively, the facing 48 may be composed of a low elongation material (e.g., nylon fabric) to facilitate energy transfer to the detachable connection 50. As discussed in detail below, the detachable connection 50 may include a thread configured to break upon airbag deployment, or a hook-and-loop fastener configured to separate upon airbag deployment. As illustrated, the detachable connection 50 extends about a portion of the perimeter of the cover 28. Consequently, when the fabric material 46 and the facing 48 are rigidly secured to the support structure 30, deployment of the airbag will induce the fabric material 46 to separate from the facing 48 along the detachable connection 50. As a result, the airbag may contact the front passenger, thereby substantially reducing the possibility of contact between the front passenger and the instrument panel 20 during a high g-force event.

In the illustrated embodiment, the fabric material 46 and the facing 48 are secured to the support structure 30 via compression between the frame 36 and the pinch trims 42. However, it should be appreciated that alternative embodiments may utilize other rigid connections, such as mechanical fasteners or adhesives, for example. Furthermore, while a detachable connection between the fabric material 46 and the facing 48 is employed in the illustrated embodiment to facilitate separation of a portion of the cover 28 from the support structure 30, it should be appreciated that alternative detachable connections between the cover 28 and the support structure 30 (e.g., clips, gaskets, teeth, etc.) may be utilized in alternative embodiments. Moreover, while the illustrated wrapped instrument panel 20 is rectangular, it should be appreciated that alternative embodiments may include instrument panels 20 have different shapes. For example, the instrument panel 20 may be particularly shaped to match the contours of other elements of the vehicle interior 12, thereby providing a desired appearance.

Figure 4:
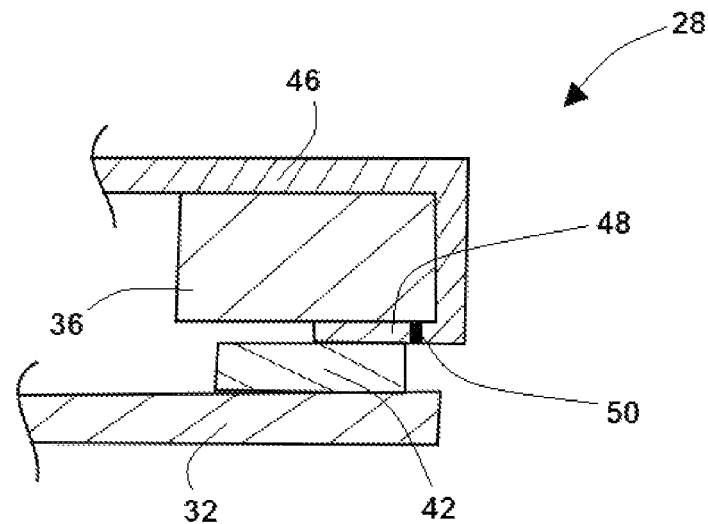
FIG. 4 is a cross-sectional view of an embodiment of a detachable connection between fabric material and a support structure.

FIG. 4 is a cross-sectional view of an embodiment of a detachable connection between the fabric material 46 and the support structure. As illustrated, an edge of the instrument panel cover 28 wraps around the frame 36 and is compressed between the pinch trim 42 and the frame 36. For example, to secure the cover 28 to the support structure 30, each edge of the cover 28 is wrapped around the frame 36, the pinch trims 42 are positioned adjacent to the edges, and the frame 36 is secured to the substrate 32 via a heat staking process. As illustrated, the edge of the cover 28 having the facing 48 is compressed between the frame 36 and the pinch trim 42. Consequently, during airbag deployment, the fabric material 46 will separate from the facing 48 along the detachable connection 50, thereby facilitating contact between the airbag and the front passenger. In addition, because an edge of the fabric material 46 is rigidly coupled to the support structure in a similar manner, the fabric material 46 will remain attached to the support structure 30 after the airbag deploys.

As previously discussed, the detachable connection 50 may include a thread or a hook-and-loop type coupling. If a thread is employed, contact between the airbag and the fabric material 46 will pull the fabric material 46 away from the facing 48, thereby inducing the thread to break. As a result, a portion of the fabric material 46 will separate from the support structure 30, thereby facilitating airbag deployment. Similarly, if a hook-and-loop type coupling is employed, contact between the airbag and the fabric material 46 will pull the fabric material 46 away from the facing 48, thereby inducing the hook-and-loop coupling to separate. While a thread and hook-and-loop type coupling are described above, it should be appreciated that other detachable connections (e.g., adhesives, mechanical fasteners, etc.) may be employed in alternative embodiments. Furthermore, while the illustrated embodiment includes a pinch trim 42 positioned between the cover 28 and the substrate 32, it should be appreciated that alternative embodiments may compress the cover 28 directly between the frame 36 and the substrate 32, thereby obviating the pinch trim 42.

Figure 5:
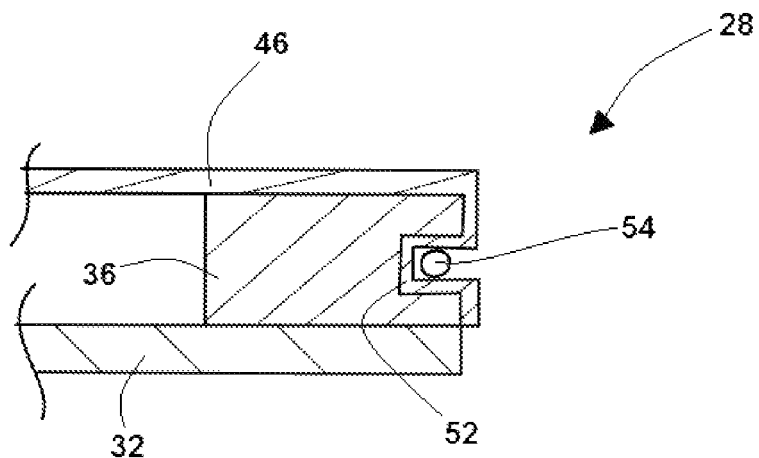
FIG. 5 is a cross-sectional view of another embodiment of a detachable connection between fabric material and a support structure.

FIG. 5 is a cross-sectional view of another embodiment of a detachable connection between the fabric material 46 and the support structure 30. As illustrated, the frame 36 includes a groove 52 configured to receive an edge of the fabric material 46. A gasket 54 (e.g., rubber, plastic, etc.) is disposed within the groove 52 to detachably secure the edge of the fabric material 46 to the frame 36. In this configuration, contact between the airbag and the fabric material 46 will pull the fabric material 46 away from the frame 36, thereby releasing the gasket 54 from the groove 52. As a result, a portion of the fabric material 46 will separate from the support structure 30, thereby facilitating airbag deployment. Because the fabric material 46 is directly coupled to the frame 36, the facing 48 discussed above with reference to FIGS. 3 and 4 may be obviated. Furthermore, it should be appreciated that a portion of the fabric material 46 is rigidly coupled to the frame 36 and/or the substrate 32 such that the cover 28 does not completely separate from the support structure 30.

Figure 6:
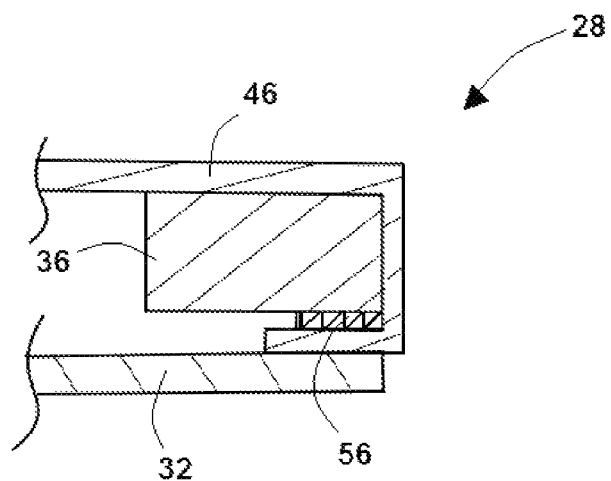
FIG. 6 is a cross-sectional view of a further embodiment of a detachable connection between fabric material and a support structure.

FIG. 6 is a cross-sectional view of a further embodiment of a detachable connection (e.g., release mechanism) between the fabric material 46 and the support structure 30. As illustrated, the frame 36 includes multiple teeth 56 configured to detachably secure an edge of the fabric material 46 to the support structure 30. In the illustrated embodiment, the edge of the fabric material 46 is compressed between the teeth 56 of the frame 36 and the substrate 32. Consequently, the fabric material 46 will be detachably secured to the support structure 30 via friction between the teeth 56 and the fabric material 46. However, contact between the airbag and the fabric material 46 will pull the fabric material 46 away from the frame 36, thereby disengaging the fabric material 46 from the teeth 56. As a result, a portion of the fabric material 46 will separate from the support structure 30, thereby facilitating airbag deployment. Because the fabric material 46 is directly coupled to the frame 36, the facing 48 discussed above with reference to FIGS. 3 and 4 may be obviated. Furthermore, it should be appreciated that a portion of the fabric material 46 is rigidly coupled to the frame 36 and/or the substrate 32 such that the cover 28 does not completely separate from the support structure 30. While the illustrated embodiment includes teeth 56 coupled to the frame 36, it should be appreciated that alternative embodiments may include teeth coupled to the substrate 32, either alone or in combination with the frame teeth.

Figure 7:
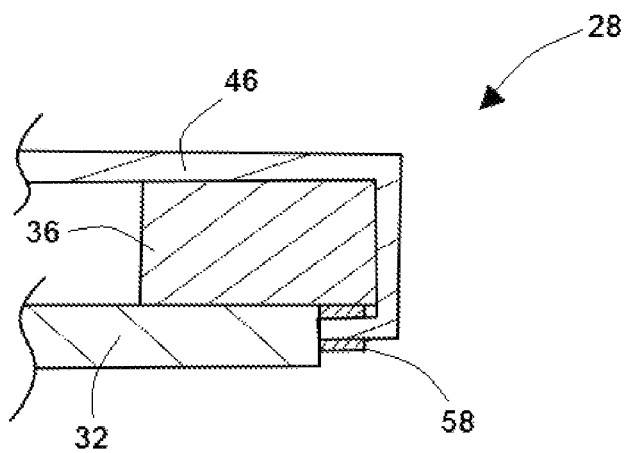
FIG. 7 is a cross-sectional view of yet another embodiment of a detachable connection between fabric material and a support structure.

FIG. 7 is a cross-sectional view of yet another embodiment of a detachable connection between the fabric material 46 and the support structure 30. As illustrated, the substrate 32 includes a clip 58 configured to detachably secure an edge of the fabric material 46 to the support structure 30. In the illustrated embodiment, the edge of the fabric material 46 is compressed between opposing elements of the clip 58, thereby detachably securing the fabric material 46 to the substrate 32. In this configuration, contact between the airbag and the fabric material 46 will pull the fabric material 46 away from the substrate 32, thereby disengaging the fabric material 46 from the clip 58. As a result, a portion of the fabric material 46 will separate from the support structure 30, thereby facilitating airbag deployment. Because the fabric material 46 is directly coupled to the substrate 32, the facing 48 discussed above with reference to FIGS. 3 and 4 may be obviated. Furthermore, it should be appreciated that a portion of the fabric material 46 is rigidly coupled to the frame 36 and/or the substrate 32 such that the cover 28 does not completely separate from the support structure 30. While the illustrated embodiment includes a clip 58 coupled to the substrate 32, it should be appreciated that alternative embodiments may include a clip 58 coupled to the frame 36. In addition, it should be appreciated that multiple clips 58 may be positioned along the perimeter of the cover 28 to detachably couple the fabric material 46 to the support structure 30.

Figure 8:
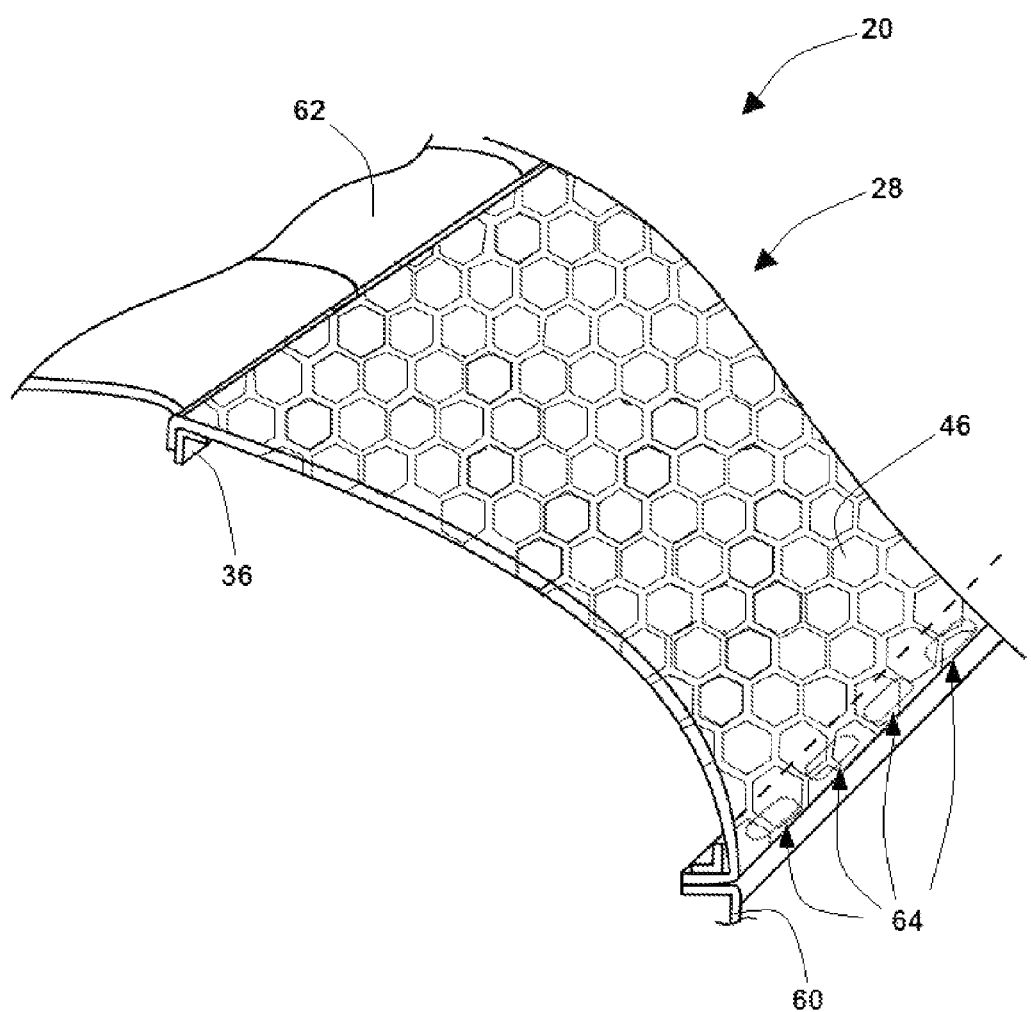
FIG. 8 is a perspective view of an embodiment of a fabric wrapped interior panel having a detachable connection between fabric material and a support structure.

FIG. 8 is a perspective view of an embodiment of a fabric wrapped interior panel having a detachable connection between the fabric material and the support structure. As illustrated, the fabric wrapped instrument panel 20 includes a lower substrate 60, an upper substrate 62 and a cover 28 extending between the substrates. In the illustrated embodiment, an upper edge of the fabric material 46 is rigidly secured to the upper substrate 62 via compression between the frame 36 and the upper substrate 62. In addition, a lower edge of the fabric material 46 is detachably coupled to the lower substrate 60 via a release mechanism. As discussed in detail below, the frame 36 and the lower substrate 60 each include a layer of reclosable fastening material configured to interlock through openings 64 within the fabric material 46. In this configuration, airbag deployment will induce the lower edge of the fabric material 46 to separate the layers of reclosable fastening material, thereby facilitating detachment of the lower edge of the fabric material 46 from the lower substrate 60.

Figure 9:
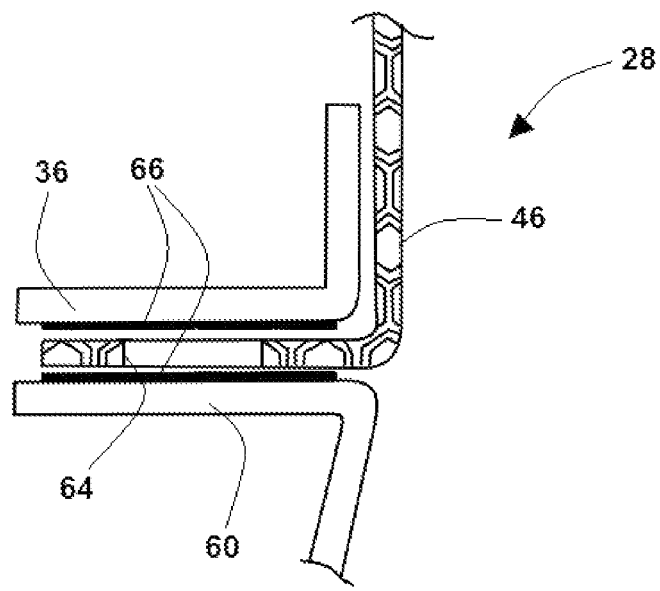
FIG. 9 is a cross-sectional view of the detachable connection shown in FIG. 8.

FIG. 9 is a cross-sectional view of the detachable connection shown in FIG. 8. As illustrated, the lower substrate 60 includes a first layer of reclosable fastening material 66, and the frame 36 includes a second layer of reclosable fastening material 66. The first layer of reclosable fastening material and the second layer of reclosable fastening material are configured to engage one another through the opening 64, thereby detachably securing the fabric material 46 to the lower substrate 60. In this configuration, contact between the airbag and the fabric material 46 will pull the fabric material 46 away from the lower substrate 60, thereby separating the layers of reclosable fastening material 66. As a result, a portion of the fabric material 46 will separate from the lower substrate 60. Because the upper edge of the fabric material 46 is rigidly coupled to the upper substrate, the cover 28 will not completely separate from the support structure. As will be appreciated, the size of each opening 64, the number of openings 64 and the properties of the reclosable fastening material may be particularly adjusted to achieve a desired detachment force, thereby facilitating airbag deployment.

Figure 10:
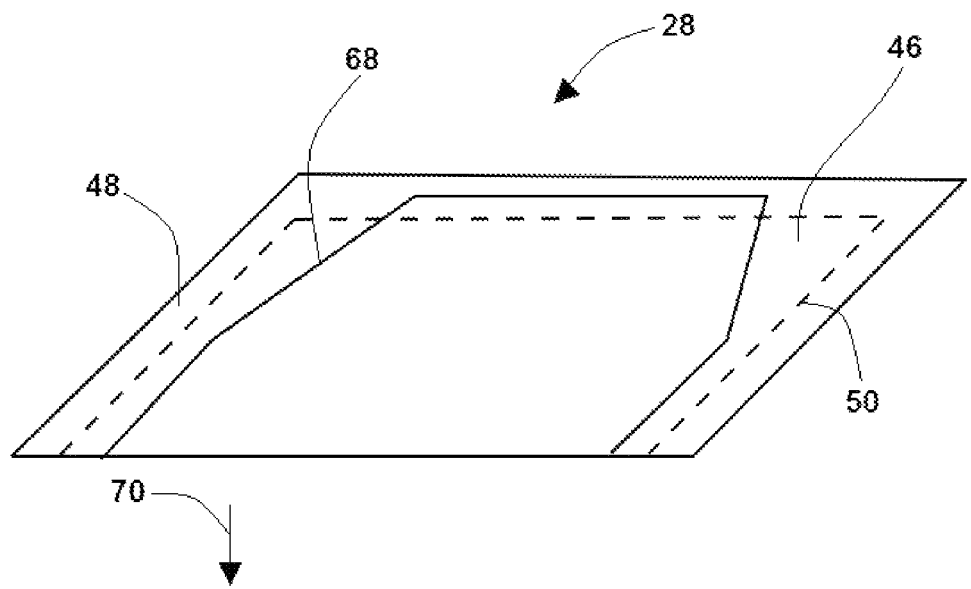
FIG. 10 is a perspective view of an exemplary instrument panel cover having a low elongation material.

FIG. 10 is a perspective view of an exemplary instrument panel cover 28 having a low elongation material. In the illustrated embodiment, the detachable connection 50 is a thread configured to detachably couple the fabric material 46 to the facing 48. As illustrated, a first edge of the low elongation material 68 (e.g., nylon fabric) is detachably coupled to a first edge of the fabric material 46 by the thread. In addition, a second edge of the low elongation material 68 and a second edge of the fabric material 46 are rigidly coupled to the support structure 30. In this configuration, the low elongation material 68 is configured to direct energy associated with airbag deployment (e.g., along the direction 70) to the thread, thereby facilitating thread breakage. As a result, the low elongation material may substantially reduce or eliminate the possibility of tears forming within the fabric material 46 during airbag deployment.

Figure 11:
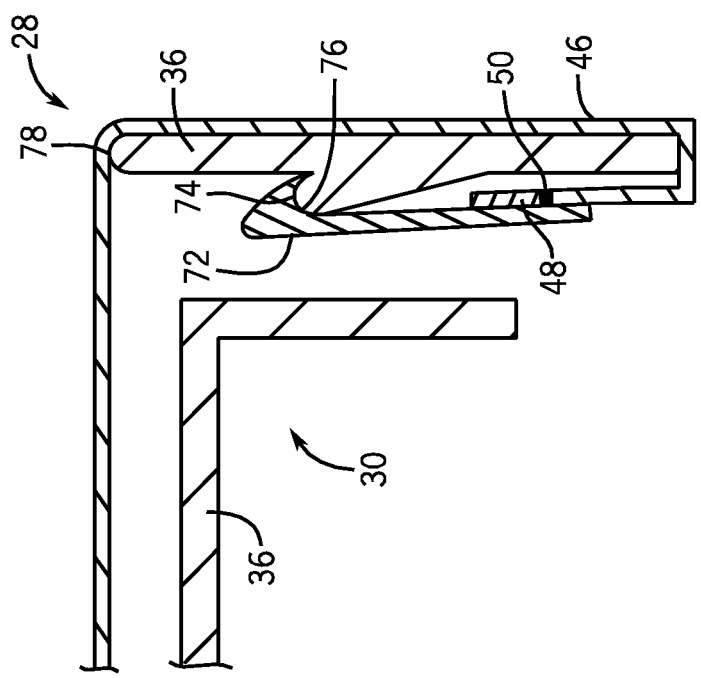
FIG. 11 is a cross-sectional view of another embodiment of a detachable connection between fabric material and a support structure.

FIG. 11 is a cross-sectional view of another embodiment of a detachable connection between the fabric material 46 and the support structure 30. In the illustrated embodiment, a hook 72 is employed to secure the cover 28 to the frame 36 of the support structure 30. As illustrated, the hook 72 includes a recess 74 configured to interface with a protrusion 76 of the frame 36, thereby securing the cover 28 to the frame 36. For example, in certain embodiments, the facing 48 is secured to the hook 72 (e.g., via a sewn connection), and the fabric material 46 is secured to the facing 48 by the detachable connection 50. Accordingly, the instrument panel 20 may be formed by attaching a first hook 72 to a first side of the frame 36, drawing the cover 28 over the frame 36, and attaching a second hook 72 to a second side of the frame 36. In this configuration, during airbag deployment, the fabric material 46 will separate from the facing 48 along the detachable connection 50, thereby facilitating contact between the airbag and the front passenger. It should be appreciated that a portion of the fabric material 46 is rigidly coupled to the facing 48 (e.g., via a thick/strong thread) such that the cover 28 does not completely separate from the support structure 30 during airbag deployment. In certain embodiments, the hook 72 may be composed of extruded polypropylene, or another suitable polymer. In addition, the cover 28 may include multiple hooks 72 extending along a substantial portion of each side of the cover 28. In such a configuration, a durable connection between the cover 28 and the support structure 30 is established when the hooks 72 are engaged with the frame 36.

In the illustrated embodiment, the frame 36 includes an extension 78 configured to provide a gap between the fabric material 46 and a body of the frame 36. In this configuration, contact between the fabric material 46 and the frame 36 is limited to desired regions of the instrument panel 20. For example, the extension 78 may extend about a perimeter of the frame 36, thereby limiting contact between the fabric layer 46 and the frame 36 to the periphery of the instrument panel 20. As a result, the show surface of the instrument panel 20 may be substantially smooth, thereby enhancing the appearance of the vehicle interior 12.

Figure 12:
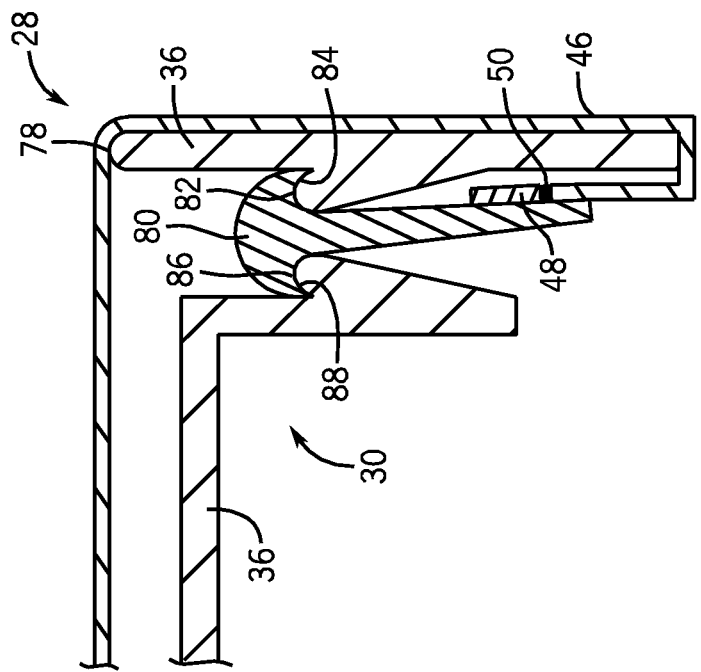
FIG. 12 is a cross-sectional view of a further embodiment of a detachable connection between fabric material and a support structure.

FIG. 12 is a cross-sectional view of a further embodiment of a detachable connection between the fabric material 46 and the support structure 30. Similar to the embodiment described above with reference to FIG. 11, a hook 80 is employed to secure the cover 28 to the frame 36 of the support structure 30. As illustrated, the hook 80 includes a first recess 82 configured to interface with a first protrusion 84 of the frame 36, and a second recess 86 configured to interface with a second protrusion 88 of the frame 36. Consequently, when the hook 80 is engaged with the protrusions 84 and 88, movement of the cover 28 relative to the frame 36 is substantially blocked. Because the hook 80 utilizes multiple recesses 82 and 86, the hook 80 may accommodate greater loads than the single-recess hook 72 described above with reference to FIG. 11. In certain embodiments, the hook 80 may be composed of extruded polypropylene, or another suitable polymer. In addition, the cover 28 may include multiple hooks 80 extending along a substantial portion of each side of the cover 28. In such a configuration, a durable connection between the cover 28 and the support structure 30 is established when the hooks 80 are engaged with the frame 36.

In certain embodiments, the instrument panel 20 may include additional features configured to enhance the appearance and/or add functionality to the vehicle interior 12. For example, speakers may be positioned behind the cover 28 to enhance the audio performance of the vehicle, and/or to provide a clean interior appearance. As will be appreciated, the fabric material 46 of the cover 28 may facilitate passage of acoustical energy from the speakers to the vehicle interior. Consequently, the speakers may be concealed within the instrument panel 20, thereby obviating separate speaker enclosures, and enhancing the visual appearance of the vehicle interior. In addition, other electronic devices, such as sensors (e.g., capacitive switches, etc.) or radio frequency identification tags (e.g., for paying tolls, etc.), may be concealed behind the cover 28, thereby further enhancing the appearance of the vehicle interior 12.

In addition, the support structure 30 may include ribs configured to press against the fabric material 46, thereby establishing a desired pattern within the cover 28. Furthermore, patterns (e.g., logos, stitching, printing, etc.) may be coupled to the show surface or the rear surface of the fabric material 46 to further enhance the appearance of the instrument panel 20. For example, a rigid form may be coupled to the rear surface of the fabric material, and configured to press against the fabric material to establish a desired pattern in the show surface. The weave pattern of the fabric material 46 may also be particularly selected to provide a desired appearance and/or to reduce the glare associated with light reflecting off the instrument panel 20. Moreover, a coating may be applied to the fabric material 46 to provide a desired appearance, to block ultraviolet radiation, to enhance acoustical damping, and/or to provide a desired tactile feel.

In further embodiments, a lighting system may be positioned behind the fabric material 46 to establish ambient lighting within the vehicle interior 12. For example, an array of light emitting diodes (LEDs) may be distributed across the rear surface of the fabric material. In such a configuration, the fabric material 46 may scatter the light from the LED array, thereby providing diffuse lighting to the vehicle interior 12. In addition, a heating element may be positioned behind the fabric material 46 to facilitating vehicle interior heating during cold ambient conditions. In certain embodiments, the fabric material 46 may be configured to facilitate heat transfer through the cover 28. Accordingly, the heating element may efficiently and quickly increase the temperature of the vehicle interior to facilitate passenger comfort.

In certain embodiments, foam may be positioned behind the fabric material 46 to enhance the appearance of the instrument panel 20, and/or to provide additional occupant safety. For example, foam pads may be coupled to the rear surface of the fabric material 46 adjacent to the support structure 30 to absorb energy associated with an impact. In addition, foam pads and/or spray foam may be applied to the rear surface of the fabric material 46 to provide a desirable appearance, and/or to establish a desired haptic feel. For example, foam may be wrapped between the support structure 30 and the fabric material 46 to change the appearance of the show surface. The foam may also be configured to absorb sound energy, thereby reducing vehicle interior noise. For example, foam anechoic cones may be positioned behind the fabric material 46 to absorb sound energy associated with vehicle operation.

Furthermore, the fabric material 46 may be configured to receive a hook-and-loop fastener, thereby enabling an occupant to mount devices to the instrument panel 20. For example, pockets including a hook-and-loop fastener may be secured to the fabric material 46 to provide additional storage. In further embodiments, a pocket may be rigidly coupled to the fabric material 46 to accommodate storage of portable electronic devices, maps, coins, etc. The fabric material 46 may also include seams configured to break upon contact with the airbag, thereby directing the fabric material 46 away from the airbag during deployment.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An airbag deployment system, comprising:
   a support structure;
   a fabric material configured to form a show surface of a vehicle interior panel, wherein a first portion of the fabric material is rigidly coupled to a first portion of the support structure;
   a facing rigidly coupled to a second portion of the support structure; and
   a thread configured to detachably secure the facing to a second portion of the fabric material, wherein the thread is configured to break upon contact between an airbag and the fabric material, wherein the facing is rigidly coupled to the second portion of the support structure via at least one hook having a first recess configured to engage a first protrusion of the support structure.

2. The airbag deployment system of claim 1, wherein the facing comprises a low elongation material.

3. The airbag deployment system of claim 1, comprising a low elongation material rigidly coupled to the first portion of the support structure, and detachably coupled to an edge of the second portion of the fabric material by the thread, wherein the low elongation material is configured to direct energy associated with airbag deployment to the thread.

4. The airbag deployment system of claim 1, wherein the facing is sewn to the second portion of the support structure.

5. The airbag deployment system of claim 1, wherein the at least one hook comprises a polymer material.

6. The airbag deployment system of claim 1, wherein the at least one hook comprises a plurality of hooks, and the facing is rigidly coupled to the second portion of the support structure via the plurality of hooks extending along a side of the facing.

7. The airbag deployment system of claim 1, wherein the support structure comprises an extension configured to provide a gap between the fabric and a body of the support structure.

8. The airbag deployment system of claim 7, wherein the extension extends about a perimeter of a frame of the support structure.

9. The airbag deployment system of claim 1, wherein the at least one hook comprises a second recess configured to engage a second protrusion of the support structure.

10. An airbag deployment system, comprising:
    a support structure;
    a fabric material configured to form a show surface of a vehicle interior panel, wherein a first portion of the fabric material is coupled to the support structure by a rigid connection; and
    a facing coupled to a second portion of the support structure via at least one hook having a recess configured to engage a protrusion of the support structure, wherein a second portion of the fabric material is coupled to the facing by a detachable connection, and the detachable connection is configured to release the second portion of the fabric material from the facing upon contact between an airbag and the fabric material.

11. The airbag deployment system of claim 10, wherein the facing is coupled to the second portion of the support structure by a sewn connection.

12. The airbag deployment system of claim 10, wherein the at least one hook comprises a polymer material.

13. The airbag deployment system of claim 10, wherein the at least one hook comprises a plurality of hooks, and the facing is rigidly coupled to the second portion of the support structure via the plurality of hooks extending along a side of the facing.

14. The airbag deployment system of claim 10, wherein the support structure comprises an extension configured to provide a gap between the fabric material and a body of the support structure.

15. The airbag deployment system of claim 14, wherein the extension extends about a perimeter of a frame of the support structure.

16. The airbag deployment system of claim 10, wherein the at least one hook comprises a second recess configured to engage a second protrusion of the support structure.

17. The airbag deployment system of claim 10, wherein the detachable connection comprises a thread configured to detachably secure the facing to the second portion of the fabric material.

18. An airbag deployment system, comprising:
    a support structure;
    a facing rigidly coupled to a first portion of the support structure via a hook having a recess configured to engage a protrusion of the support structure; and
    a fabric material configured to form a show surface of a vehicle interior panel, wherein a first portion of the fabric material is detachably coupled to the facing by a detachable connection, and the detachable connection is configured to release the first portion of the fabric material from the facing upon contact between an airbag and the fabric material.

19. The airbag deployment system of claim 18, wherein a second portion of the fabric material is coupled to a second portion of the support structure.

20. The airbag deployment system of claim 18, wherein the detachable connection comprises a thread configured to detachably couple the first portion of the fabric material to the facing.

* * * * *